United States Patent Office 3,741,968
Patented June 26, 1973

3,741,968
CERTAIN O-(2-PYRIMIDYL) PHOSPHATES AND THEIR USE AS INSECTICIDES
Albert Howard Haubein, Newark, Del., assignor to Hercules Incorporated, Wilmington, Del.
No Drawing. Filed Nov. 12, 1971, Ser. No. 198,415
Int. Cl. C07d 51/36
U.S. Cl. 260—251 P     5 Claims

ABSTRACT OF THE DISCLOSURE

Disclosed are compounds of the formula:

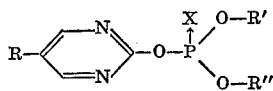

in which R is selected from the group consisting of H, F, Cl, Br and I, R' and R" are selected from the group consisting of $CH_3$ and $C_2H_5$, and X is selected from the group consisting of O and S. These compounds have utility as insecticides.

---

This invention is in the chemical arts. It relates to that part of organic chemistry having to do with esters. It also relates to insecticides.

The term "insect" is used in this specification in its broadest sense. It encompasses not only those arthropods classified as insects, but also those arthropods classified as arachnids.

Similarly, the terms "insecticide" and "insecticidal" are used in this specification in their broadest senses. They mean insect killer and insect killing, respectively, insect being as defined herein.

In summary, this invention in one aspect provides a new group of organic phosphates and thiophosphates. These compounds are represented by the general structural formula:

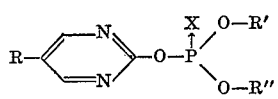

in which R is selected from the group consisting of H, F, Cl, Br and I, R' and R" are selected from the group consisting of $CH_3$, and $C_2H_5$, and X is selected from the group consisting of O and S. Examples of specific compounds of this invention include:

O,O-dimethyl O-2-pyrimidyl phosphate
O-methyl O-ethyl O-2-pyrimidyl phosphate
O,O-diethyl O-2-pyrimidyl phosphate
O-(5-chloro-2-pyrimidyl) O,O-diethyl phosphate
O-(5-fluoro-2-pyrimidyl) O,O-dimethyl phosphate
O,O-dimethyl O-2-pyrimidyl phosphorothioate
O-methyl O-ethyl O-2-pyrimidyl phosphorothioate
O,O-diethyl O-2-pyrimidyl phosphorothioate
O-(5-chloro-2-pyrimidyl) O,O-diethyl phosphorothioate
O-(5-iodo-2-pyrimidyl) O,O-dimethyl phosphorothioate The compounds of this invention in general are liquid at 20–25° C. In general, the water solubility of each is less than 0.5 gram per liter of water, the acetone solubility of each is greater than 5 grams per liter of acetone, and the benzene solubility of each is greater than 5 grams per liter of benzene.

Another property of the compounds of this invention is that at practical concentrations they are toxic to a number of insects. Consequently, the compounds of this invention are useful as insecticides.

Each compound of this invention is made by the reaction represented by the following equation:

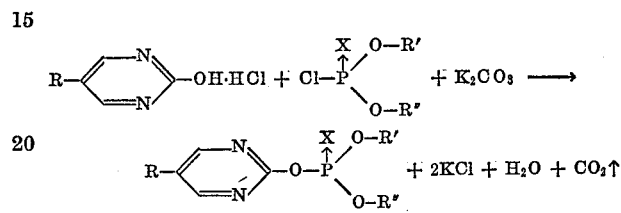

This reaction preferably is carried out in a suitable inert liquid reaction medium such as, for example, acetone, methylethyl ketone, diethyl ether, dioxane, or the like. The reaction temperature is high enough to give a reasonable rate of reaction, but less than the temperature at which substantial decomposition of the end product or a reactant occurs. Satisfactory results are obtained when the reaction temperature is in the range from about 35 to about 80° C., and preferably in the neighborhood of 60° C. Acid acceptor substances other than $K_2CO_3$ can be employed. Examples of such substances include basic inorganic compounds such as, for example, NaOH, KOH, $Na_2CO_3$, $K_2CO_3$, $NaHCO_3$, $KHCO_3$, and the like, organic bases such as, for example, triethylamine, pyridine, and the like, mixtures of these compounds alone, and mixtures of these compounds with $K_2CO_3$. The reaction is generally carried out at atmospheric pressure. However, superatmospheric and subatmospheric pressures are within the broader concepts of this invention.

Another reaction by which each compound of this invention is made is represented by the following equation:

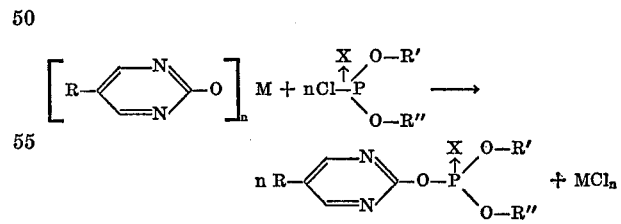

M in the foregoing equation is a metallic cation having the valence M. Examples of M include the light metals, for instance, alkali metals (sodium, potassium, etc.), alkali earth metals (calcium, barium, magnesium, etc.), and the heavy metals, for instance, copper, zinc, silver, iron, cobalt, nickel, etc. The above discussion pertaining to an inert liquid reaction medium, reaction temperature and reaction pressure applies to this reaction also.

For insecticide use the compounds of this invention preferably are incorporated into dispersible compositions. Such a composition comprises an effective quantity of toxic material and application aid material.

The toxic material consists essentially of at least one compound of this invention. In some embodiments of this composition the toxic material comprises only one compound of this invention. In other embodiments the toxic material comprises two or more compounds of this invention. In still other embodiments, it comprises not only one or more compounds of this invention, but one or more other insecticides.

Specific embodiments of the composition of this invention range from concentrates of the toxic material to the ultimate composition that is applied to insect habitats. Accordingly, an effective concentration of the toxic material in the composition of this invention is in a broad range, generally being from about 0.1 to about 90% by weight of the composition. Higher and lower concentrations, however, are within the broader scope of this invention. In concentrate embodiments, the concentration of the toxic material generally is in a range from about 10 to about 90% by weight of the composition and preferably in a range from about 10 to about 50% by weight of the composition. In the ultimate use embodiments, the concentration generally is in a range from about 0.1 to about 20% by weight of the composition and preferably in a range from about 0.5 to about 10% by weight of the composition.

Application aid material is generally inert material that facilitates distribution or dispersion of the toxic material when it is applied to insect habitats. It encompasses diluents, carriers, extenders, surfactants, spreading agents, sticking agents, wind drift control agents, and the like. It also includes inert gas of the kind that is employed in aerosol sprays, when the toxic material is to be applied by aerosol spraying.

In those embodiments of the composition of this invention, which are normally solid, the application aid material generally comprises an inert solid in a divided condition.

Some embodiments of the solid composition are granular, while others are dispersible powders or dusts.

The granular compositions are of the coated type, the impregnated type or the incorporated type.

The coated type of granular composition is made by dusting a wettable powder or ground powder comprising the toxic material onto granular carrier material which either before or after the dusting has been admixed with an adhesive or a sticker. Water, oils, alcohols, glycols, aqueous gums, waxes and the like including mixtures thereof, are used as stickers. Examples of granular carrier material include attaclay, corn cobs, vermiculite, walnut hulls and almost any granular mineral or organic material screened to the desired particle size (generally 15–60 mesh, preferably about 30 mesh, U.S. screen size). Generally the toxic material is about 2–20% by weight of the composition, the sticker is generally about 5–40% by weight of the composition, and the granular carrier material is generally about 60–93% by weight of the composition.

In the case of the impregnated type of granular composition, the toxic material as such when normally liquid or after melting, or dissolved in a solvent, is sprayed on or poured into the granular carrier material. The solvent can be removed by evaporation, or permitted to remain. In either case, the toxic material impregnates the particles of the granular carrier material. Examples of the granular carrier material include those just mentioned with respect to the coated type of granular composition.

The toxic material is generally about 2–20% by weight of the composition, while the granular carrier material is generally about 80–98% by weight of the composition.

The incorporated type of granular composition is made by admixing the toxic material with an inert finely divided solid such as, for example, clay, carbon, plaster of Paris and the like, and made into a mud with water or other inert evaporable liquid. The mud is then dried to a solid sheet or cake, broken up or comminuted, and screened to the desired particle size (generally 15–60 mesh, preferably about 30 mesh, U.S. screen size). In other embodiments, the mud is put into a granular pan and granules are formed therein with subsequent removal of the water or solvent. In still another procedure, the mud is extruded through a die into rods which are cut into small pieces. In the incorporated type of granular composition, the toxic material generally is about 2–50% by weight of the composition, and the solid carrier material is about 50–98% by weight of the composition.

In all granular embodiments of the composition of this invention, various additives in minor concentrations relative to the carrier material also can be present.

In other embodiments of the solid composition of this invention, the carrier is usually a dispersible inert solid. A typical dispersible solid of this type is clay. Other suitable solids (dispersible solid) include talc, attapulgite, pyropylite, diatomaceous earth, kaolin, aluminum magnesium silicate, montmorillonite, fullers earth, sawdust and the like. The solid dispersible composition can be air dispersible, in which case it is usually referred to as a dust. Generally, when it is intended that the composition be water dispersible, the composition preferably contains emulsifying material (one or more surfactants) at a concentration sufficient to enable a suspension of the desired degree of stability to be formed when the composition is admixed with a suitable quantity of water. The composition in such case is usually referred to as a wettable powder. A typical dispersible solid composition of this invention generally comprises about 10–50% by weight of toxic material, about 50–90% by weight of solid carrier material and, when emulsifying material is present, about 1–10% by weight of emulsifying material.

Other specific embodiments of the toxic composition of this invention comprise homogeneous liquid solutions of toxic material in inert, preferably volatile, usually water immiscible solvents for the toxic material. Examples of suitable solvents include isophorone, cyclohexanone, methyl isobutyl ketone, acetone, xylene, benzene, toluene, and the like. Such a solution, which can be regarded as a concentrate, typically comprises about 10–50% by weight of toxic material and about 50–90% by weight of solvent. The solution can be applied as is, or diluted with more solvent, or dispersed in water, or water dispersed in it. Preferably, when it is intended that the solution be dispersed in water or water dispersed in it, the mixture of solution and water also comprises emulsifying material at a concentration sufficient to enable a dispersion of the desired degree of stability to be formed when the solution or concentrate is mixed with water. A typical emulsifying material concentration is about 1–10% by weight of the concentrate. The water concentration generally is such that the toxic material concentration preferably is about 0.5–10% by weight of the total composition.

Examples of the surfactants employed in both the liquid and solid compositions of this invention comprise the well known surface active agents of the anionic, cationic and non-ionic types and include alkali metal (sodium or potassium) oleates and similar soaps, amine salts of long chain fatty acids (oleates), sulfonates, animal and vegetable oils (fish oils and castor oil), sulfonated acyclic hydrocarbons, sodium salts of lignin sulfonic acids, alkyl-naphthalene sodium sulfonates, sodium lauryl sulfonate, disodium monolauryl phosphate, sorbitol laurate, pentaerythritol monostearate, glycerol monostearate, polyoxyethylene, ethylene oxide condensates of stearic acid, stearyl alcohol, stearyl amine, rosin amines, dehydroabietyl amine and the like, lauryl amine salts, dehydroabietyl amine salts, lauryl pyridinium bromide, stearyl trimethylammonium bromide, and cetyl dimethylbenzylammonium chloride. Still other examples are listed in "Detergents and Emulsifiers—1968 Annual" by John W. McCutcheon.

In addition to the toxic material and application aid material, some specific embodiments of the insecticidal composition of this invention comprise one or more other components, examples of which include insect attractants, herbicides, fungicides, plant nutrients, and the like.

The composition of this invention is used by applying it by conventional ways and means to the habitat of insects to be controlled.

The rate of application of the composition of this invention is such as to provide an effective concentration of the toxic material in the insect habitat. In general such a concentration is in the range from about 5 to about 200 milligrams per square foot.

The best mode now contemplated of carrying out this invention is illustrated by the following working examples of various aspects of this invention, including specific embodiments. This invention is not limited to these specific embodiments. In the examples all percentages are by weight unless otherwise indicated, all parts by weight are indicated by "w.," all parts by volume are indicated by "v.," and each part by weight (w.) bears the same relation to each part by volume (v.) as the kilogram does to the liter.

EXAMPLE 1

This example illustrates how to make O,O-diethyl O-2-pyrimidyl phosphorothioate.

To 2-pyrimidol hydrochloride (325 w.), made as described in the literature by reacting 1,1,3,3-tetramethoxy propane and urea in ethanol with hydrogen chloride, in acetone (2500 v.) is added potassium carbonate (675 w.). To the resulting solution is admixed diethyl chlorothiophosphate (475 w.) dropwise at a rate such that it takes about an hour to complete the addition. The resulting reaction mixture is maintained for 18 hours at 20–25° C., and then refluxed for 6 hours. The reaction mixture is cooled to 20–25° C., added to water (5000 v.) and extracted with diethylether (2000 v.). The ether extract is washed with water, dried over anhydrous sodium sulfate, and the diethyl ether removed by distillation to a pot temperature of 80° C. at 18 millimeters of mercury pressure. The pot residue (503 w.), typically a brown liquid, is the desired end product. It consists essentially of O,O-diethyl O-2-pyrimidyl phosphorothioate. A typical elemental analysis is: $N=10.3\%$; $P=13.9\%$; $Cl=0.5\%$ (calculated: $N=11.2\%$; $P=12.4\%$; $Cl=0\%$). A typical purity of the end product thus obtained is 84% by NMR.

EXAMPLE 2

This example illustrates how to make O-(5-chloro-2-pyrimidyl) O,O-diethyl phosphorothioate.

To 5-chloro-2-pyrimidol hydrochloride (15.9 w.), made by admixing 1 mole of chlorine to an aqueous solution of 2-pyrimidol hydrochloride at 50–70° C., followed by removal of solvent under vacuum and crystallization of the residue from methanol, in acetone (100 v.), is admixed potassium carbonate (27 w.). To this mixture is admixed diethyl chlorothiophosphate (17 w.) dropwise at a rate such that it takes about an hour to complete the addition. The resulting reaction mixture is maintained for 18 hours at 20–25° C., and refluxed for 6 hours. The reaction mixture is cooled to 20–25° C., added to water (5000 v.) and extracted with diethyl ether (2000 v.). The ether extract is washed with water, dried over anhydrous sodium sulfate, and the diethyl ether removed by distillation to a pot temperature of 80° C. at 18 millimeters of mercury pressure. The pot residue (15.5 w.), typically a dark liquid, is the desired end product, and it consists essentially of O-(5-chloro-2-pyrimidyl) O,O-diethyl phosphorothioate. A typical elemental analysis is: $P=10.6\%$; $Cl=12.5\%$; and $N=6.91\%$ (calculated: $P=10.9\%$; $Cl=12.3\%$; and $N=9.9\%$).

EXAMPLE 3

This example illustrates how to make diethyl 2-pyrimidyl phosphate.

To 2-pyrimidol hydrochloride (13 w.), made as indicated in Example 1, in acetone (100 v.) is admixed potassium carbonate (27 w.). To this mixture is added diethyl chlorophosphate (17 w.). After the resulting reaction mixture is maintained for 24 hours at 20–25° C., it is refluxed for 4 hours. The reaction mixture is added to water (5000 v.) and extracted with diethyl ether (2000 v.). The ether extract is washed with water, dried over anhydrous sodium sulfate, and the diethyl ether removed by distillation to a pot temperature of 80° C. at 18 millimeters of mercury pressure. The pot residue (3.6 w.), typically a yellow liquid, is the desired end product. It consists essentially of diethyl 2-pyrimidyl phosphate. This end product as obtained has a typical purity of about 80% as determined by NMR.

EXAMPLE 4

This example illustrates an emulsifiable concentrate of this invention and how to make it.

The formulation of this concentrate is as follows:

| Components: | Quantities |
| --- | --- |
| Toxic material | w-- 1 |
| Polyoxyethylene (20) sorbitan monolaurate | v-- 1 |
| Toluene | v-- 1 |

The toxic material consists essentially of one or more of the products of Examples 1–3.

The emulsifiable concentrate of the above formulation is made by admixing the components at 20–25° C.

The emulsifiable concentrate is used by admixing it with sufficient water to give an oil-in-water emulsion in which the concentration of the toxic material is about 1% by weight of the emulsion.

The emulsion is used by spraying it over insect habitats at a rate equivalent to 5–200 milligrams of toxic material per square foot of area being sprayed, depending on the composition of the toxic material.

Typical results obtained in the insecticide testing of the products of Examples 1–3 are presented in the following table. The table also contains for purposes of comparison typical results obtained in the insecticide testing of compounds of the U.S. Pat. 3,328,405, to Simone et al. These results appear in the table as insect mortality data expressed as percentage of exposed insects killed. These data were obtained in a commercial laboratory by procedures that are standard in that laboratory and carried out routinely in that laboratory. The procedures employ a statistically significant number of insects. In these test procedures, an emulsifiable concentrate of the product and having the formulation of Example 4 is made and admixed with enough water to give an oil-in-water emulsion in which the toxic material concentration is 1.0% by weight of the emulsion. Aliquot portions of the emulsion are diluted with additional water to give emulsions in which the toxic material concetnrations are as indicated in the table, in percent by weight or parts per million parts by weight of the emulsions. In the case of the Adult Mosquito contact toxicity test the toxic material concentration is expressed as milligrams per square foot of surface to which the toxic material has been applied. The emulsions are then applied to test insects according to the test procedures.

TABLE.—INSECT MORTALITY DATA, CONTACT TOXICITY TESTS

| Toxic material | Corn root worm | | | House fly | | | Mexican bean beetle | | | Pea aphid | | | Plum curculio | | | Southern army worm | | | Two-spotted mite | | |
|---|---|---|---|---|---|---|---|---|---|---|---|---|---|---|---|---|---|---|---|---|---|
| concentration* | .05 | .005 | .001 | .05 | .01 | .005 | .1 | .01 | .005 | .01 | .005 | | .1 | .05 | .025 | .1 | .01 | .005 | .1 | .01 | .005 |
| Product of Ex. 1 | 100 | 100 | 40 | 100 | 100 | 100 | 100 | 100 | 0 | 100 | 100 | | 100 | 100 | 80 | 100 | 100 | 70 | 100 | 100 | 80 |
| Product of Ex. 2 | 100 | 100 | | 100 | 100 | 100 | 100 | 0 | | 100 | 30 | | 100 | 100 | 100 | 100 | 100 | | 100 | 100 | |
| Product of Ex. 3 | 100 | 40 | | 100 | 100 | 100 | 100 | 100 | | 100 | 100 | | 100 | 70 | 40 | 100 | 100 | | 100 | 100 | |
| Product of Ex. 2 of U.S. Patent 3,328,405 | | 0 | 0 | 100, 52 | | | 0 | | | 0 | | | 100, 0 | | | 60, 0 | | | 0 | | |
| Product of Ex. 1 of U.S. Patent 3,328,405 | 60 | | 0 | 100 | 100 | 100 | 100 | | | 100 | | 50 | 0 | | | 100 | | | 0 | | |

| | Mosquito | | Systemic toxicity tests | | | | | |
|---|---|---|---|---|---|---|---|---|
| | Adult | Larvae | | PA | | SoAW | | TSM |
| Toxic material concentration* | 100 mg./ft.³ | .1 p.p.m. | .01 p.p.m. | 50 p.p.m. | 10 p.p.m. | 50 p.p.m. | 10 p.p.m. | 50 p.p.m. | 10 p.p.m. |
| Product of Ex. 1 | 100 | 0 | | 80 | 100 | 100 | 100 | 100 | 100 |
| Product of Ex. 2 | 100 | 100 | 0 | 100 | | 100 | 100 | 100 | |
| Product of Ex. 3 | 100 | 100 | 0 | 100 | | 0 | | 100 | |
| Product of Ex. 2 of U.S. Patent 3,328,405 | 0 | 100, 20 | | 0 | | 0 | | 0 | |
| Product of Ex. 1 of U.S. Patent 3,328,405 | 100 | 100 | | 100 | 100 | | | | |

*Percent by weight unless indicated otherwise.

As can be seen in the table, compared to the compounds of U.S. Pat. 3,328,405, the compounds of this invention have a broader spectrum of insecticidal activity. In this connection at the test concentrations indicated in the table the compounds of this invention are effective in both the contact and systemic toxicity tests relative to the Two-Spotted Mite, whereas the two compounds in the patent are not. Hence, a feature of advantage of the compounds of this invention is their toxicity to the Two-Spotted Mite.

Thus, this invention provides new insecticides of outstanding activity.

Other features, advantages and specific embodiments of this invention will become readily apparent to those exercising ordinary skill in the art after reading the foregoing disclosures. Such specific embodiments are within the scope of the claimed subject matter unless expressly indicated to the contrary by claim language. Moreover, while specific embodiments of this invention have been described in considerable detail, variations and modifications of them can be effected without departing from the spirit and scope of the invention as disclosed and claimed.

The expression "consisting essentially of" as used in this specification excludes any unrecited substance at a concentration sufficient to substantially adversely affect the essential properties and characteristics of the composition being defined, while permitting the presence of one or more unrecited substances at concentrations insufficient to substantially adversely affect said essential properties and characteristics.

I claim:

1. A compound represented by the structural formula:

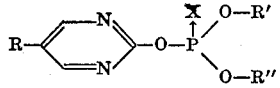

in which R is selected from the group consisting of H, F, Cl, Br and I, R' and R" are selected from the group consisting of $CH_3$ and $C_2H_5$, and X is selected from the group consisting of O and S.

2. A compound according to claim 1 in which R is H, and R' and R" are $C_2H_5$.

3. A compound according to claim 2 in which X is O.

4. A compound according to claim 2 in which X is S.

5. A compound according to claim 1 in which R is Cl, R' and R" are $C_2H_5$, and X is S.

References Cited
UNITED STATES PATENTS 2,754,243  7/1956  Gysin et al. _____ 167—33

ALEX MAZEL, Primary Examiner
R. V. RUSH, Assistant Examiner

U.S. Cl. X. R.
424—251